US010652964B1

(12) United States Patent
Verfuerth

(10) Patent No.: US 10,652,964 B1
(45) Date of Patent: May 12, 2020

(54) SYSTEMS AND METHODS RELATED TO PHOTOVOLTAIC DIRECT DRIVE LIGHTING SYSTEMS

(71) Applicant: Energy Bank Incorporated, Manitowoc, WI (US)

(72) Inventor: Neal R. Verfuerth, Manitowoc, WI (US)

(73) Assignee: Energy Bank Incorporated, Manitowoc, WI (US)

( * ) Notice: Subject to any disclaimer, the term of this patent is extended or adjusted under 35 U.S.C. 154(b) by 0 days.

(21) Appl. No.: 16/213,307

(22) Filed: Dec. 7, 2018

Related U.S. Application Data

(60) Provisional application No. 62/635,166, filed on Feb. 26, 2018, provisional application No. 62/695,142, filed on Jul. 8, 2018.

(51) Int. Cl.

| | |
|---|---|
| ***H05B 33/08*** | (2020.01) |
| ***F21V 23/00*** | (2015.01) |
| ***H02J 3/38*** | (2006.01) |
| *F21Y 105/10* | (2016.01) |
| *F21Y 115/10* | (2016.01) |

(52) U.S. Cl.
CPC ....... *H05B 33/0845* (2013.01); *F21V 23/001* (2013.01); *F21V 23/003* (2013.01); *H02J 3/383* (2013.01); *F21Y 2105/10* (2016.08); *F21Y 2115/10* (2016.08)

(58) Field of Classification Search
CPC ...... F21V 23/001; F21V 23/003; H02J 3/383; F21Y 2105/10; F21Y 2115/10
See application file for complete search history.

(56) References Cited

U.S. PATENT DOCUMENTS

2013/0002142 A1* 1/2013 Sawada .............. H05B 33/0809 315/152

* cited by examiner

*Primary Examiner* — Wei (Victor) Y Chan
*Assistant Examiner* — Henry Luong
(74) *Attorney, Agent, or Firm* — Quarles & Brady LLP

(57) ABSTRACT

A lighting system incorporating both direct current power produced by a photovoltaic panel and direct current power converted from alternating current power and a controller for determining the mixture of the two power sources to deliver to a plurality of light fixtures to provide a predetermined suitable light level within a space. The lighting system also providing regulation and monitoring of energy usage of electronic devices through at least one control device accessible through a user interface and at least one controller.

5 Claims, 10 Drawing Sheets

SYSTEMS AND METHODS RELATED TO PHOTOVOLTAIC DIRECT DRIVE LIGHTING SYSTEMS

RELATED APPLICATIONS

This application claims the benefit of U.S. Provisional Patent App. No. 62/635,166, filed 26 Feb. 2018, entitled, “Systems and Methods Related to Photovoltaic Direct Drive Lighting Systems” and also claims the benefit of U.S. Provisional Patent App. No. 62/695,142, filed 8 Jul. 2018, entitled, “Systems and Methods Related to Regulating and Monitoring Electricity Usage,” both of which are incorporated herein by reference in their entirety.

BACKGROUND OF THE INVENTION

Efficient use of natural resources is an ongoing initiative for many, from the global level to the individual. One avenue for reducing a carbon footprint is the use of solar power captured by photovoltaic panels and distributed into an electrical power grid. Generally, photovoltaic panels are used as a secondary on-site power generation system to be used to supplement a main power input generated by a power generation system, such as that provided by a utility company. The photovoltaic panels generate direct current (DC) which is then inverted to alternating current (AC) to be incorporated into the power grid, on-site or otherwise, for use.

Lighting devices and systems incorporating light emitting diodes (LEDs) utilize DC power to drive the LEDs. Therefore, the utility-provided AC power, and any secondary power input whether AC or DC inverted to AC, must be converted to DC power to drive the LEDs. Energy losses are experienced during the power conversion processes.

Additionally, when it comes to the end user’s ability to regulate and monitor the use of electricity in a residence or business, that ability is generally limited to lighting controls such as turning lights on and off, dimming, photoelectric controls, and timers, but the end user does not have the ability to configure an electric system beyond these controls and has no way of knowing how much energy is being used for any one device or “zone” of devices.

Therefore, the art of energy efficient lighting systems would benefit from a more efficient system capable of better utilizing the DC power produced from secondary power sources such as photovoltaic panels and could also benefit from an electric system capable of better regulating and monitoring energy usage of electronic devices and “zones” of devices.

SUMMARY OF THE INVENTION

The present disclosure relates to a lighting system that better utilizes the DC power produced from secondary power sources such as photovoltaic panels. The lighting system incorporates direct current power produced by a photovoltaic panel, without inversion, and direct current power converted from alternating current power, where such AC power may have been inverted from DC or provided by a power main. A controller may determine a desired combination of power from multiple power sources to be delivered to a plurality of light fixtures to provide an adjustable predetermined suitable light level within a space.

The present disclosure also relates to a lighting system that better regulates and monitors energy usage of electronic devices.

An embodiment of a lighting system according to the present invention includes at least one photovoltaic (PV) panel and a first light fixture comprising a first light emitting diode (LED) configured to receive raw DC power directly from the at least one PV panel.

According to a further aspect of an embodiment of a lighting system according to the present invention, the system may include a second light fixture having a second LED configured to receive converted DC power from an alternating current (AC) power source through a driver. A controller may be provided in electrical communication with the PV panel, the driver, and the first and second light fixtures, whereby the controller is configured to maintain a predetermined lumen setpoint level as output by one or more of the fixtures.

According to another aspect of an embodiment of a lighting system according to the present invention, a current sensor may be configured to sense the amount of raw DC power produced by the at least one PV panel, provide an output voltage based on the amount of raw DC power sensed, and communicate the output voltage to the controller. The output voltage from the current sensor may be converted to a dimming line voltage which determines the amount of converted DC power to be output by the driver to the second LED.

According to still another aspect of an embodiment of a lighting system according to the present invention, the first light fixture may include a first LED array board including the first LED and a second LED array board including a third LED configured to receive converted DC power from the AC power source through a second driver. The second light fixture may include a third LED array board including the second LED and a fourth LED array board having a fourth LED configured to receive raw DC power directly from the at least one PV panel. The first driver and the second driver may be supported or mounted within a distribution power module housing.

According to another embodiment of a lighting system according to the present invention, a light fixture includes one or more LEDs (Raw-DC LEDs) that run on raw DC power sourced from a PV panel and one or more LEDs (Converted-DC LEDs) that run on converted DC power, sourced from an LED driver which converts AC power to the converted DC power. The driver may be situated in a distribution power module housing. All of the LEDs (both the Raw- and Converted-DC LEDs) in this fixture may be mounted on the same LED array board. The quantity of Raw-DC LEDs and Converted-DC LEDs provided in the fixture may be different or identical. The system may further include a controller in electrical communication with the PV panel, the driver, and the at least one light fixture, whereby the controller is configured to maintain a predetermined lumen setpoint level. The system may additionally include a current sensor configured to sense an amount of raw DC power produced by the at least one PV panel, provide an output voltage based on the amount of raw DC power sensed, and communicate the output voltage to the controller. The output voltage from or based on input from the current sensor may be converted to a dimming line voltage which determines the amount of converted DC power to be output by the driver to the Converted-DC LED(s).

An embodiment of a method according to the present invention includes a method for distributing power to electric devices in an electric system, including the step of providing a photovoltaic (PV) panel configured to produce raw DC power. A light fixture (having a first light emitting diode (LED) array board with a first LED and a second LED array board with a second LED) is provided and coupled to the PV panel so as to receive the raw DC power. The raw DC power is delivered to the first LED from the PV panel. A dimmable driver may be provided and configured to deliver converted DC power to the second LED. A predetermined lumen level setpoint, which relates to the light output from the fixture, may be entered into a controller (e.g., through a software interface on a handheld device and wirelessly communicated to the controller). The level of DC power being received from the PV panel can be measured and then, depending on the predetermined lumen level setpoint, it can be determined whether sufficient light can be provided by the fixture based on the raw DC, itself, or whether light generated by converted DC needs to be used to achieve the predetermined lumen level. If additional lighting is needed, then power can be provided to the second LED. Additional converted DC power to be delivered to the second LED can be determined through the use of a reference table that includes an index value that is based on a digital representation of the measured raw DC power. The index value may be converted into a pulse-width-modulation signal, which can then be converted to a first voltage which is amplified to provide a dimming line voltage that corresponds to a range of converted DC power output from the driver producing converted DC power between a minimum and maximum output.

Each of the first and second LED array boards may include one or more LEDs that are configured to receive converted DC power from a driver (which may be situated in a distribution power module housing) and one or more LEDs that are configured to receive raw DC power from the PV panel.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
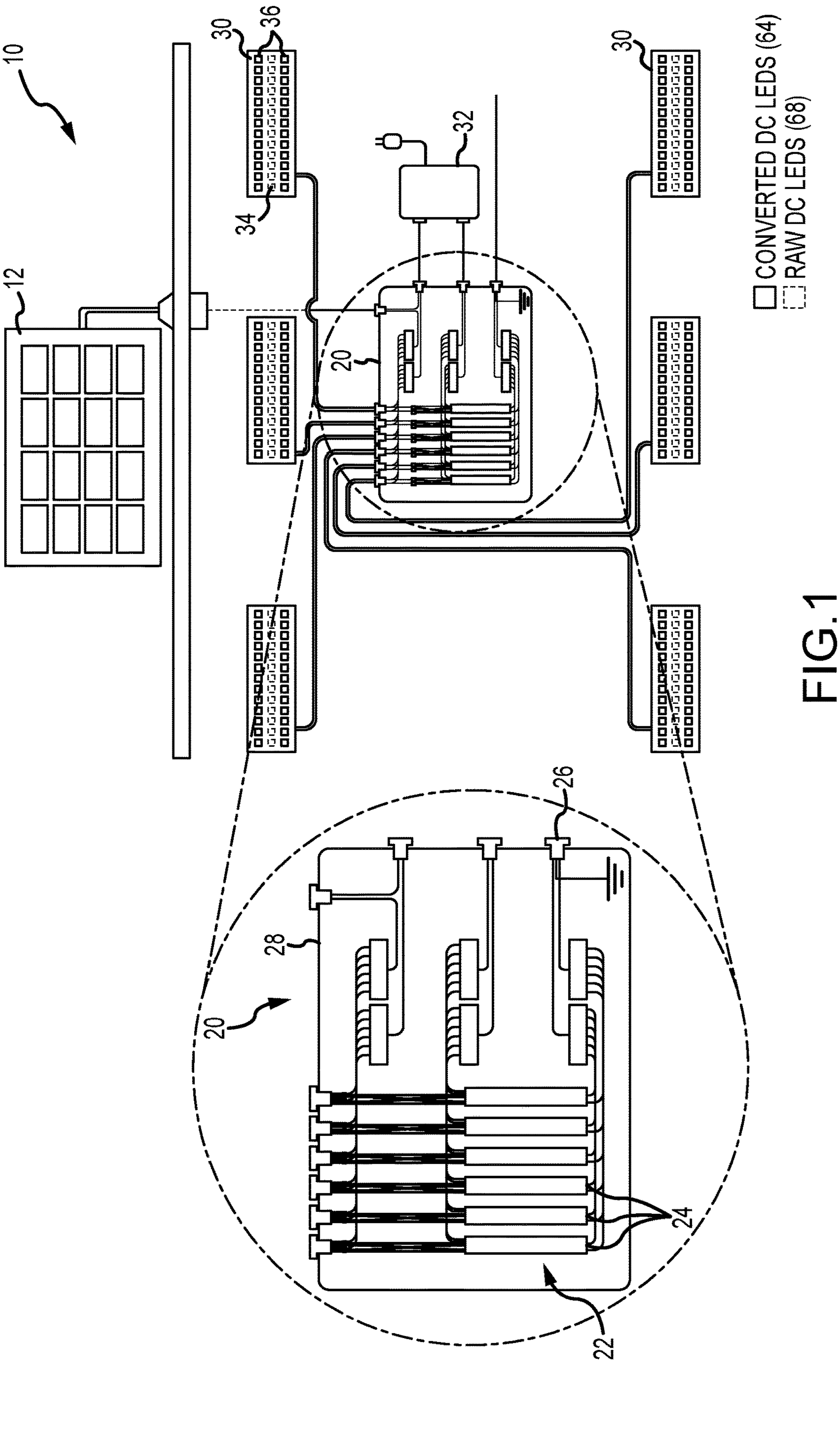
FIG. 1 is a schematic view of a first embodiment of a lighting system according to the present invention.

FIG. 1 shows a schematic and representative layout of a first exemplary embodiment 10 of a lighting system according to the present invention. The lighting system 10 preferably comprises at least one photovoltaic (PV) panel 12, a distribution power module 20; and a plurality of light fixtures 30 (although the lighting system 10 may be configured to operate with at least one light fixture).

The at least one PV panel 12 is preferably one known in the art, now or later developed, which converts energy from sunlight into direct current (DC) power ("Raw DC"). Preferably, the at least one PV panel 12 is capable of generating approximately 340 W nominal DC, however, other power generation amounts are contemplated and may depend on the number of light fixtures in the plurality of light fixtures 30.

The distribution power module 20 preferably houses a plurality of AC drivers 22 and is in electrical communication with a controller 32. The controller 32 may be housed within the distribution power module 20 or it may be housed in a separate enclosure (not shown). The distribution power module 20 may be contained in a single housing 28, preferably ventilated to allow airflow therethrough, or its functionality may be distributed across multiple unit housings (not shown).

The distribution power module 20 preferably receives Raw DC from the at least one PV panel 12 and alternating current (AC) power from a primary power source, such as a utility power plant (not shown), preferably from a branch circuit (120/208/220/240/277/480V) within the electrical system or building (not shown) in which the lighting system 10 is installed.

The AC power is preferably connected to the input side 24 of each of the plurality of AC drivers which convert the incoming AC power to DC power ("Converted DC"). The Converted DC is to be distributed to each of the plurality of light fixtures 30.

Preferably, there is at least one AC driver for each light fixture in the lighting system 10 or in the lighting circuit. Locating the plurality of AC Drivers 22 in the distribution power module 20 removes the would-be heat source from each of the plurality of light fixtures 30, which increases the potential life expectancy of the plurality of light fixtures 30 and the plurality of AC drivers 22. Further, only a single AC access point 26, or AC drop, from the branch circuit is required to electrically connect the plurality of light fixtures 30 to the electrical system. Moreover, in this setup the plurality of light fixtures 30 may be more easily wired in parallel, whereby the parallel wiring reduces potential damage to the LED array boards 72 (see FIG. 3).

Figure 11:
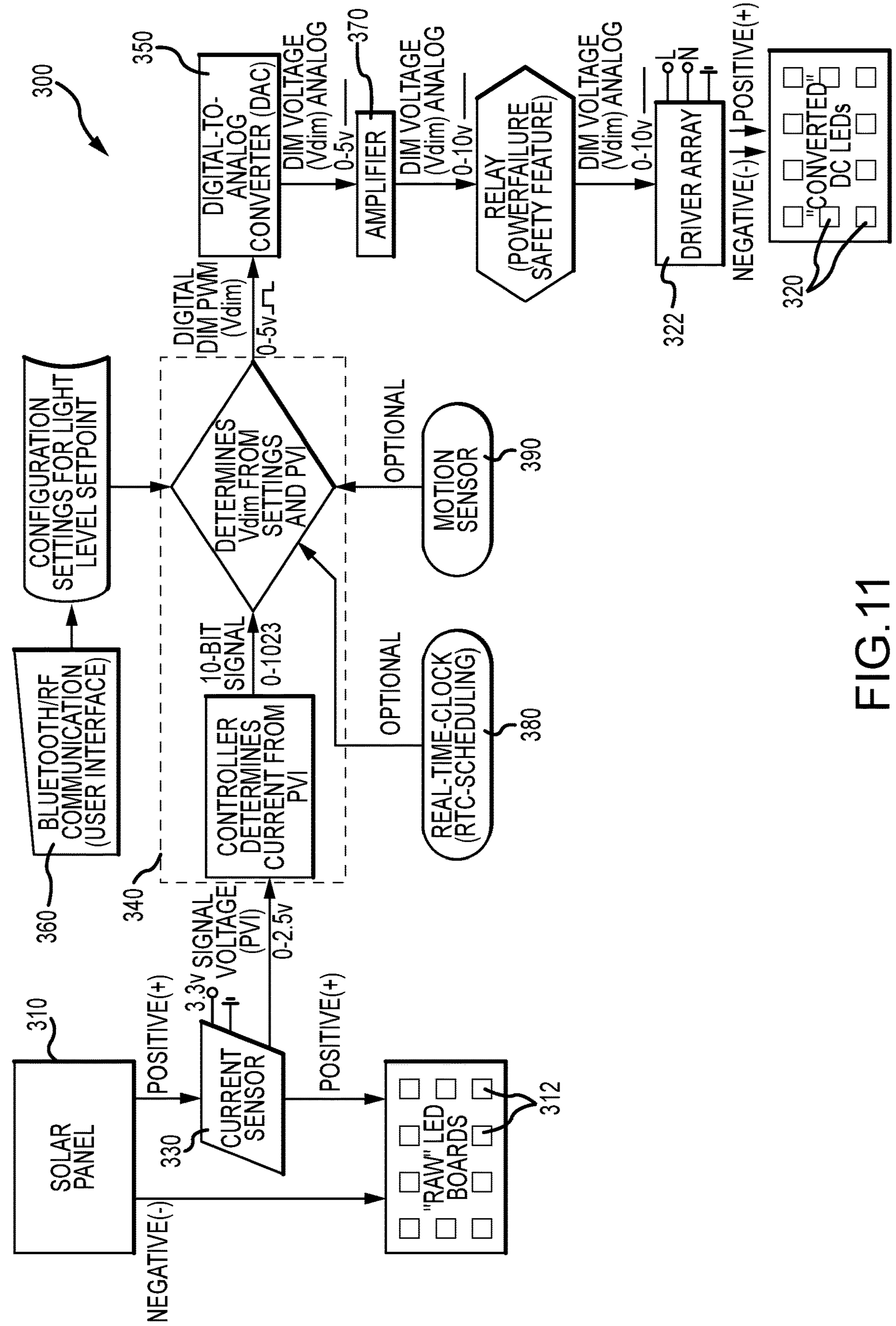
FIG. 11 is a flowchart showing a preferred method according to the present invention.

As shown in FIG. 1, the Raw DC from the at least one PV panel 12 enters the controller 32 and the controller 32 outputs a dimming line voltage to each of the plurality of AC drivers 22 and the Raw DC to the plurality of light fixtures 30 (see also FIG. 11). It is contemplated that the incoming alternating current provided to the plurality of AC drivers 22 may be metered to estimate power savings (as described further below).

The distribution power module 20 is electrically connected to the plurality of light fixtures 30 and distributes both the Raw DC and the Converted DC to each of the plurality of light fixtures 30.

Figure 3:
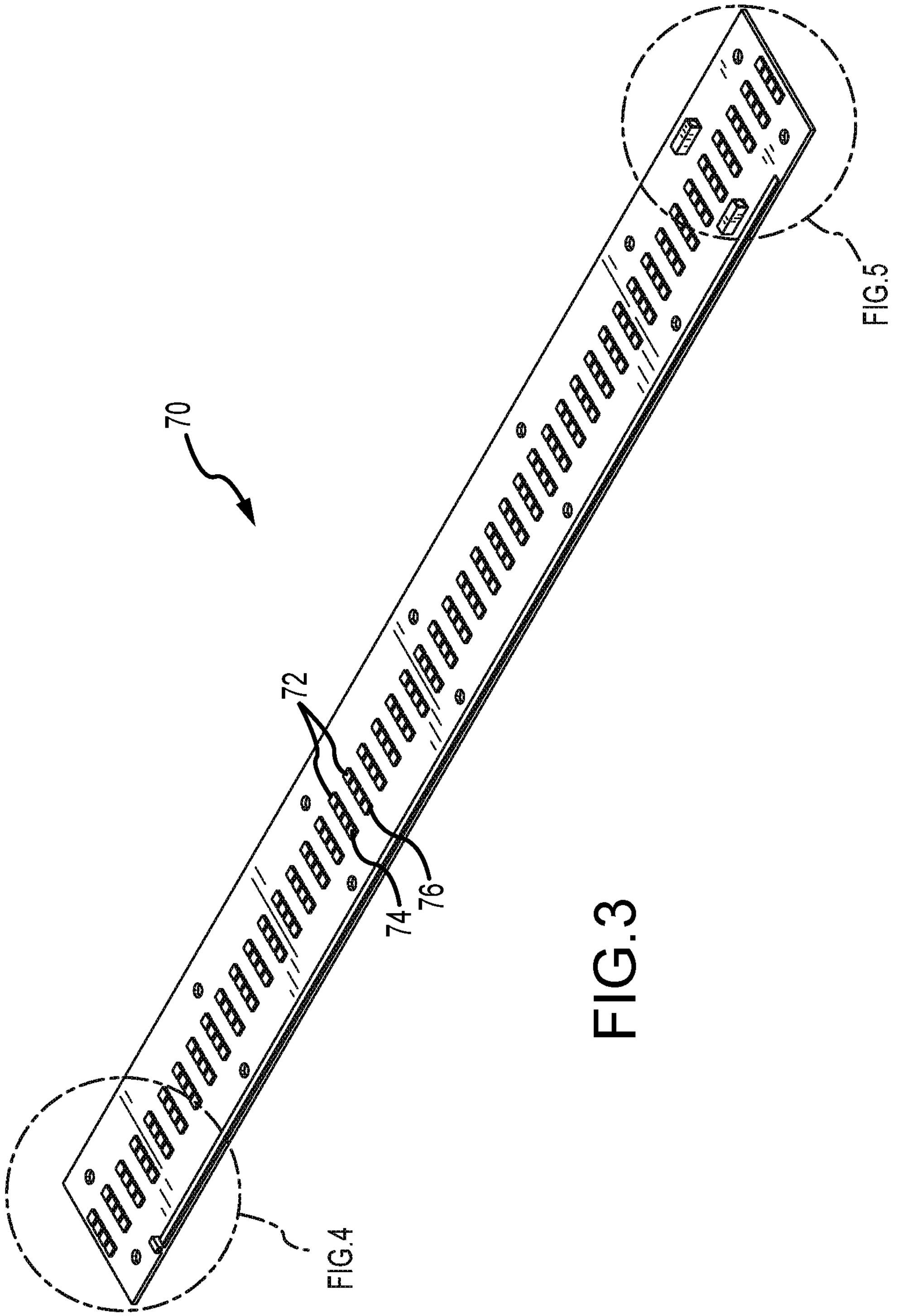
FIG. 3 is a perspective view of an LED array board according to according to present invention.

Preferably, the Raw DC is provided to a first group of light emitting diodes (LEDs) 34 (which may be mounted to a single printed circuit board (PCB) or multiple printed circuit boards or provided as COB (Chip on Board)) and the Converted DC is provided to a second group of LEDs 36 (which may be mounted to a single printed circuit board or multiple printed circuit boards) in each of the plurality of light fixtures 30 (see FIG. 3). The first and second groups of LEDs 34,36 may be arranged in the same orientation in each of the plurality of light fixtures 30, or arrangements may differ in various light fixtures in the lighting system 10.

As shown, a preferred arrangement of the first and second groups of LEDs 34,36 includes at least half as many of the first group of LEDs 34, configured to be powered by Raw DC, as the second group of LEDs 36, configured to be powered by Converted DC. In this arrangement, the first group of LEDs 34 is situated between a pair of rows of the second group of LEDs 36.

During operation, the controller 32 preferably continually, or periodically (e.g., once or more times per second, once or more times per minute (one or more seconds between measurements), or once or more times per hour (one or more minutes between measurements)) measures the Raw DC produced by the at least one PV panel 12 to make adjustments in the dimming line voltage supplied to the plurality of light fixtures 30 from the plurality of AC Drivers 22 (further discussed with respect to FIG. 11 below).

As discussed below, adjustments to the dimming line voltage output from the plurality of AC Drivers 22 are preferably made from calculations that are dependent upon the measurements of the direct current produced by the at least one PV panel 12. The calculations may also include other factors, for example, and not limited to, the time of day and/or the geographic location of the lighting system 10.

Preferably prior to normal operation, a suitable light (i.e., lumen) level, or range of light levels, is established or specified for an area or portion of an area upon which light is cast from the plurality of light fixtures 30. This process may be referred to as establishing a setpoint. In establishing the setpoint, only the second group of LEDs 36 (configured to be powered by Converted DC) of the plurality of light fixtures 30 are powered, and the power consumption of each of and/or all the plurality of light fixtures 30 is measured. It should be noted that the light level output of each of the second group of LEDs 36 of the plurality of light fixtures 30 is preferably adjustable, either by adjusting output of the plurality of AC drivers 22 collectively or individually, or by changing the number/size of the second group of LEDs used in a particular light fixture, which may be customized for a particular application.

Preferably, the plurality of AC drivers 22 have a 0-10 volt adjustability range which can be controlled electronically.

The Raw DC power preferably serves as the primary power source to the extent available, and the Converted DC power serves as supplementary and/or backup power source. As stated above, generally, the Converted DC delivered to the second group of LEDs 36 in the plurality of light fixtures 30 is determined at least partially by the direct current produced by the at least one PV panel 12. Preferably, the dimming line voltage output from each of the plurality of AC drivers 22 is adjusted in an attempt to achieve or at least substantially approximate the suitable light level setpoint.

Additionally or alternatively, ambient light in the area or portion of an area upon which light is cast from the plurality of light fixtures 30 may be measured and incorporated in determining the amount of Converted DC to provide to the second group of LEDs 36 in the plurality of light fixtures 30. The lighting system 10 may additionally use motion sensing and/or time of day controls as on/off override inputs.

After the setpoint is established, the controller 32 monitors the direct current output by the at least one PV panel 12 and adjusts the output of each of the plurality of AC drivers 22 via a 0-10V control (not shown) on the plurality of AC drivers 22 and/or provided in the controller 32 to attain the established suitable light level. Thus, during normal operation, the power from the at least one PV panel 12 powering the first group of LEDs 34 may be supplemented with the power from the plurality of AC drivers 22 to attain the required setpoint light level.

If the Raw DC output provided from the at least one PV panel 12 to the first group of LEDs 34 in the plurality of light fixtures 30 is of an amount that will produce a light level that is greater than or equal to the setpoint light level, the Raw DC may still be fed to the first group of LEDs 34 in the plurality of light fixtures 30; however, it is also contemplated that the Raw DC may be choked to provide a lower level of light at or near the setpoint. Although excess power from the at least one PV panel 12 could be stored, it could also be used simultaneously for some other purpose, such as heating or lighting an additional area.

If the Raw DC output of the at least one PV panel 12 to the first group of LEDs 34 in the plurality of light fixtures 30 is of an amount that will produce a light level that is less than the setpoint light level, then, as stated above, Converted DC is utilized to power the second group of LEDs 36 in the plurality of light fixtures 30 to supplement the Raw DC. That is, the plurality of AC drivers are used to drive the second group of LEDs 36 to supplement the light provided by the first group of LEDs 34 to achieve or at least substantially approximate the setpoint light level.

The controller 32 preferably measures the electrical outputs of the at least one PV panel 12. It is contemplated that the controller 32 may measure the watts, volts, and/or amps output from the at least one PV panel 12 and delivered to the first group of LEDs 34. To avoid problematic overcurrent damage, preferably, the total current limit of the plurality of light fixtures 30 exceeds the potential current output of the at least one PV panel 12. Geographic location and/or orientation of the at least one PV panel 12 may also be considered.

Also contemplated by the present invention is a modular wiring system with “plug-and-play” terminations (not shown), which extend from and between the distribution power module 20 to each of the plurality of light fixtures 30. Exemplary terminations may be found in U.S. Pat. No. 6,746,274, which is incorporated by reference herein in its entirety.

Figure 2:
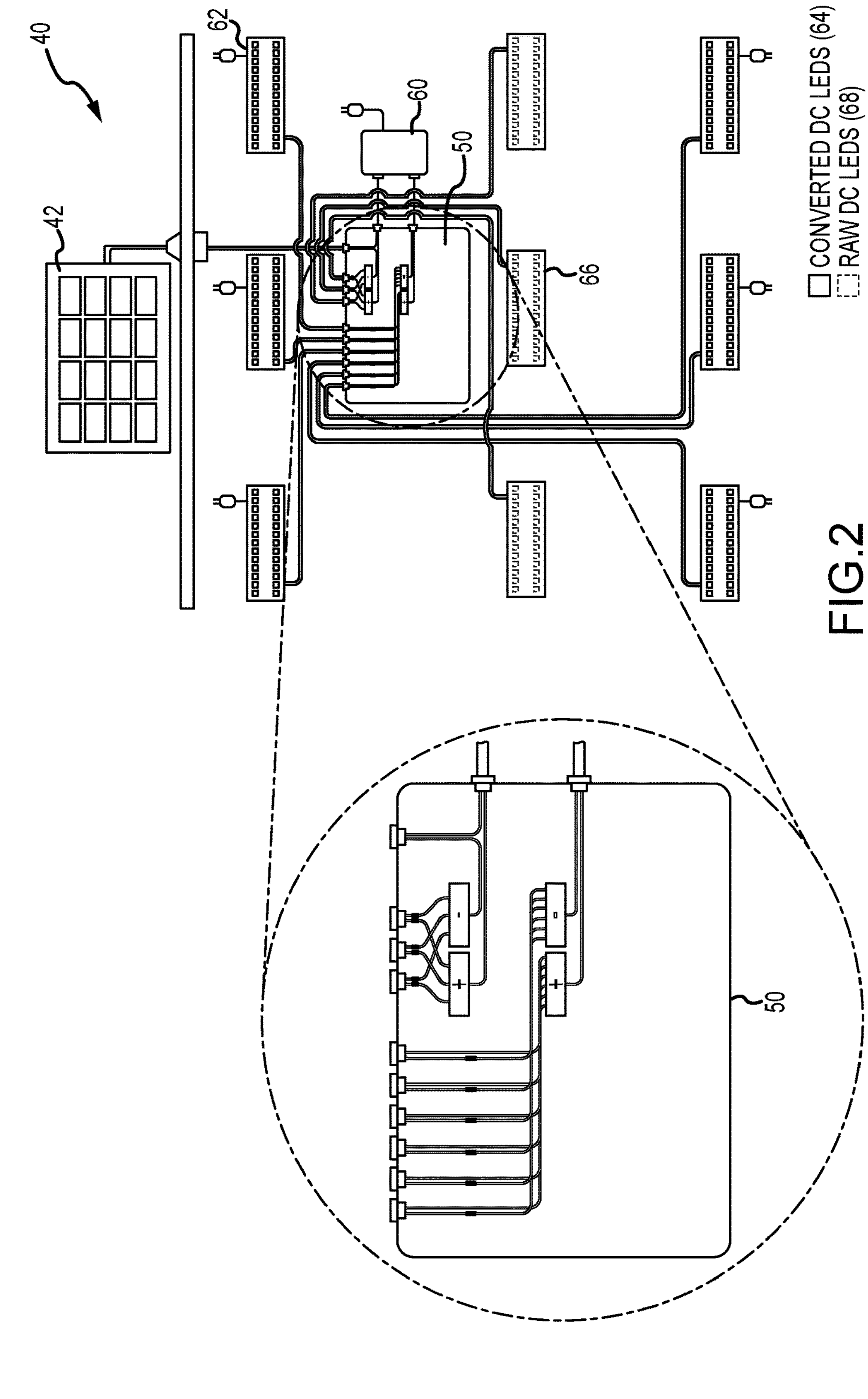
FIG. 2 is a schematic view of a second embodiment of a lighting system according to the present invention.

FIG. 2 illustrates the second exemplary embodiment 40 of a lighting system. The lighting system 40 preferably comprises at least one PV panel 42, a distribution power module 50 in electrical communication with a controller 60, at least one Converted-DC light fixture 62 configured to be powered by Converted DC and comprising a plurality of Converted-DC LEDs 64, and at least one Raw-DC light fixture 66 configured to be powered by Raw DC and comprising a plurality of Raw-DC LEDs 68. Here, the exemplary configuration illustrated in FIG. 2 is a central row comprising a plurality of Raw-DC light fixtures 66 flanked by two rows of a plurality of Converted-DC light fixtures 62. Other configurations are contemplated.

Similar to the first exemplary lighting system 10 discussed above and shown in FIG. 1, a setpoint light level is preferably maintained by the controller 60, with the Raw DC serving as the primary power source when available and the Converted DC serving as supplementary and/or backup power source.

According to the lighting system 40, the at least one Raw-DC light fixture 66 is preferably centered over a space to be illuminated, and the plurality of Converted-DC light fixtures 62 are preferably spaced along and/or around the at least one Raw-DC light fixture 66.

It will occur to one of skill in the art that the control of the second embodiment lighting system 40 may be achieved substantially similarly or identically to the first embodiment lighting system 10 described above.

Figure 4:
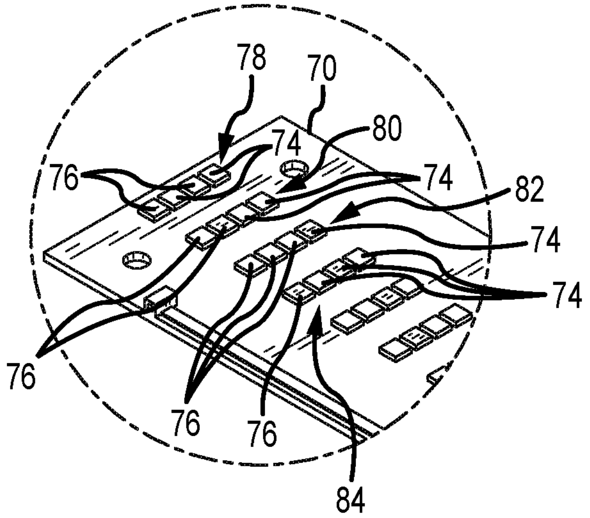
FIG. 4 is a first close-up view of the LED array board shown in FIG. 3.
Figure 5:
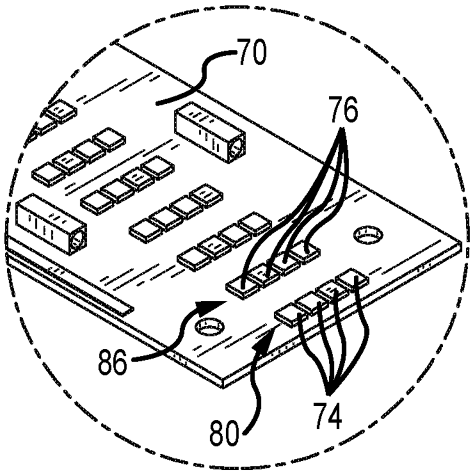
FIG. 5 is a second close-up view of the LED array board shown in FIG. 3.

An exemplary embodiment 70 of an LED array board 70 according to the present invention is shown in FIGS. 3-5. The LED array board 70 may comprise all Raw-DC LEDs 74 or all Converted-DC LEDs 76 as may be used in the first and second embodiments of light systems 10,40 discussed above. It is further contemplated that the LED array board 70 may comprise a plurality of LEDs 70 comprising at least one Raw-DC LED 74 and at least one Converted-DC LED 76.

As shown here, the plurality of LEDs 72 can be arranged in a plurality of different arrays; however, the plurality of LEDs 72 may be provided in any configuration, including arrays containing more or less than four LEDs as shown here, or a plurality of LEDs spaced apart. It should be noted that the plurality of LEDs 72 may be discreet chips or COB mounted to a single PCB or multiple PCBs.

FIG. 4 provides a first exemplary LED array 78 with an equal number of Raw-DC LEDs 74 and Converted-DC LEDs 76 in an alternating pattern; a second exemplary LED array 80 with an equal number of Raw-DC LEDs 74 and Converted-DC LEDs 76 in a consecutive pattern; a third exemplary LED array 82 with more Converted-DC LEDs 76 than Raw-DC LEDs 74; and a fourth exemplary LED array 84 with more Raw-DC LEDs 74 than Converted-DC LEDs 76.

FIG. 5 illustrates alternating fifth and sixth exemplary LED arrays 86,88 comprising Converted-DC LEDs 76 and Raw-DC LEDs 74, respectively. As can be understood, the arrangement of Raw-DC LEDs 74 and Converted-DC LEDs 76 on the LED array board 70 may vary by each individual LED array and/or each individual LED.

It is further contemplated that the plurality of LEDs 72 may be placed on an LED array board of any shape including not only rectangular as shown in FIG. 3 (LED array board 70), but, as non-limiting examples, square and circular boards as well.

Additionally, or alternatively, any number, ratio, and configuration of Converted-DC LEDs 76 and Raw-DC LEDs 74 may be provided and spaced individually about an LED board according to the present invention.

Additionally, or alternatively, any number or all of the at least one Converted-DC LED 76 can be a direct line voltage LED.

It will occur to one of skill in the art that the plurality of LEDs 72 on the LED array board 70 as herein described can be included in a plurality of light fixtures and controlled substantially similarly or identically to the plurality of light fixtures 30, 62, 66 provided in the first embodiment lighting system 10 and the second embodiment light system 40 described above.

A third embodiment (not shown) of the lighting system according to the present invention may comprise at least one PV panel directly electrically connected to at least one light fixture comprising RAW-DC LEDs (which may be discreet chips or COB mounted to a single PCB or multiple PCBs), similar to the at least one Raw-DC light fixture 66 in the second embodiment lighting system 40. This system is isolated from a grid-fed lighting system and may be incorporated as a supplement to the grid-fed lighting system or as a stand-alone, independent system.

In any of the lighting systems according to the present invention herein described or otherwise contemplated based on this disclosure, it is preferable that the Raw DC power is distributed to the plurality of light fixtures wired in parallel. Therefore, the Raw DC LEDs, individually and/or collectively, of each of the plurality of light fixtures are preferably sized to accommodate the maximum voltage output of a PV panel. The maximum voltage output of the PV panel may be determined by and/or affected by, for example, the rating of the PV panel, geographic location, and/or the orientation of the PV panel.

It is expected that, due to the direct sourcing of the Raw DC, LEDs powered directly from at least one PV panel provide a higher lumen per watt output because there are less conversion losses, including less ripple losses, caused by the AC Drivers converting the AC power from the branch circuit, or inverted from other PV systems, to the Converted DC. Preferably, a controller according to the present invention may adjust the amount of Converted DC power supplied to a plurality of light fixtures in the lighting systems according to the present invention, taking into consideration the efficiency gains (lumens per watt) in the Raw DC produced by the PV panel.

This may support rationale to utilize ambient light sensing. For instance, if there is a 10% increase in the lumen per watt output of the light fixtures with LEDs only powered by Raw DC, then, prior to determining the amount of Converted DC to supply to light fixtures containing Converted-DC LEDs, the controller can take such efficiencies into account. Thus, in this example, the measurement of the Raw DC provided by the PV panel could be increased by ten percent prior to determining the amount of Converted DC required to meet lighting demands. In this instance, a comparison would be made between 1.1*Raw DC and the setpoint light level. The greater than or equal to, or less than, setpoint light level comparisons provided above may then be undertaken.

It is further contemplated that a smart phone application may be provided to change the light level output of the lighting system according to the present invention. The application is preferably configured to allow a user (not shown) to communicate with the lighting system via any handheld electronic device or wall-mountable electronic device through wireless communication technology (e.g., BLUETOOTH®, IEEE 802.11 Wi-Fi).

As further described below, the application is preferably configured to allow a user to turn on/off and/or change the light output of the Converted DC LED(s) and/or Converted DC LED array(s) through a graphic user interface (GUI) accessible on the display of the handheld or wall-mountable electronic device.

Figure 6:
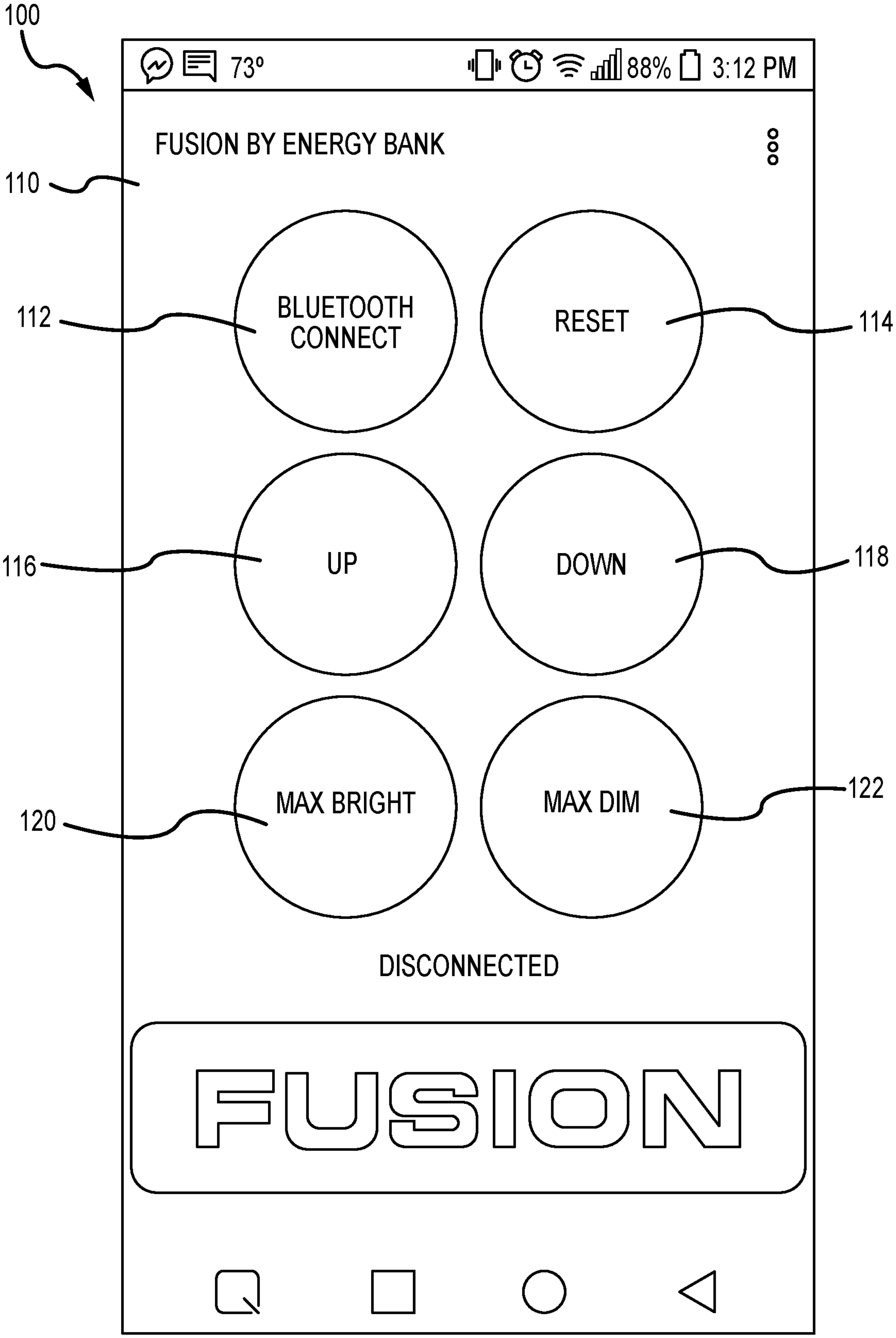
FIG. 6 is a screen capture of a first embodiment graphic user interface (GUI) of an electronic device control application according to the present invention.

FIG. 6 illustrates a screen 110 of a first exemplary embodiment of a GUI 100 on a control device (not depicted but taking the form of any computer or handheld device with a touchscreen) according to the present invention. The screen 110 preferably provides user selectable control buttons such as "Bluetooth Connect" 112, "Reset" 114, "Up" 116, "Down" 118, "Max Bright" 120, and "Max Dim" 122. It should be noted that the buttons in this embodiment and others may be provided in various colors and shapes.

Selecting "Bluetooth Connect" 112 allows a user to connect via BLUETOOTH® wireless technology with compatible electronic devices (not shown), for example light fixtures (not shown), motor controls (not shown), and other control devices (not shown), for communicating with, controlling, and/or monitoring the connected electronic devices via the GUI.

Selecting the "Reset" 114 option allows the user to reset any user settings of any connected electronic devices back to the factory setting. However, if a configuration is saved, then selecting "Reset" 114 will reset the settings to the last saved configuration.

The "Up" 116, "Down" 118, "Max Bright" 120, and "Max Dim" 122 options are configured to allow user control of connected lights. Whereby selecting and/or prolonged contact with "Up" 116 or "Down" 118 on the GUI increases or decreases the light produced by the connected lights, respectively, and selecting "Max Bright" 120 or "Max Dim" 122 increase or decreases the light levels of the connected lights to their maximum or minimum light output levels, respectively.

Figure 7:
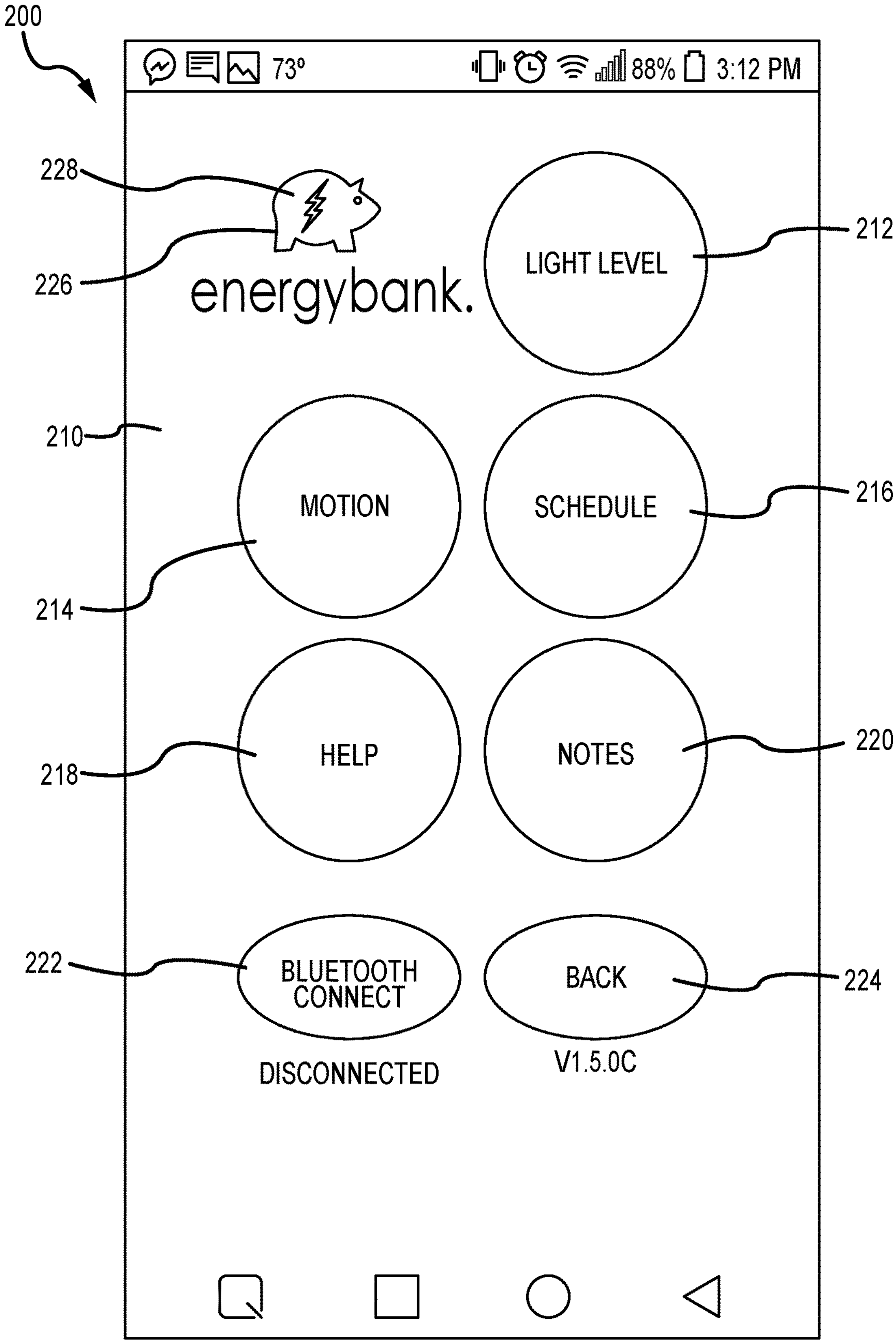
FIG. 7 is a first screen capture of a second embodiment GUI of an electronic device control application according to the present invention.

FIG. 7 illustrates a first screen 210 of a second exemplary embodiment of a GUI 200 according to the present invention. User selectable buttons include "Light Level" 212, "Motion" 214, "Schedule" 216, "Help" 218, "Notes" 220, "Bluetooth connect" 220, and "Back" 224 and includes a first display area 226 for indicia 228.

Similar to the first GUI 100, selecting "Bluetooth Connect" 222 allows a user to connect via BLUETOOTH® wireless technology with compatible electronic devices (not shown), for example light fixtures (not shown), motor controls (not shown), and other control devices (not shown), for communicating with, controlling, and/or monitoring the connected electronic devices via the GUI.

Selecting "Back" 224 brings a user back to a previous screen, which in this example could be a preselected home screen (not shown).

Selecting "Light Level" 212 preferably takes a user to a screen similar to the screen 110 described above with respect to the first embodiment GUI 100 and provides similar options regarding light levels of connected lights.

Figure 8:
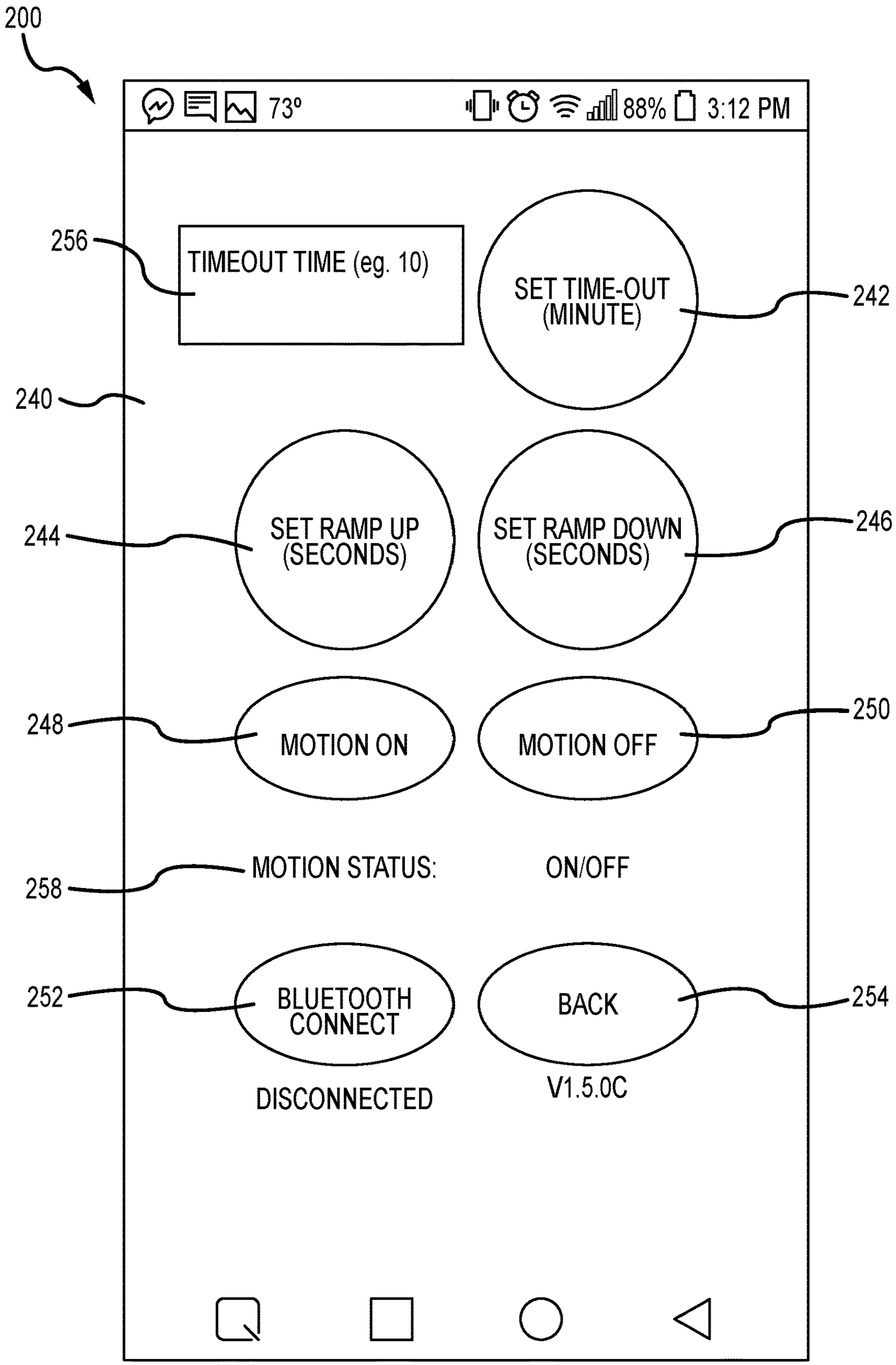
FIG. 8 is a second screen capture of the second embodiment GUI of the electronic device control application according to the present invention.

Selecting "Motion" 214 preferably takes a user to a second screen 240 shown in FIG. 8. Configurable options available from the second screen 240 include "Set Time-Out (Minute)" 242, "Set Ramp Up (Seconds)" 244, "Set Ramp Down (Seconds)" 246, "Motion On" 248, "Motion Off" 250, "Bluetooth Connect" 252, and "Back" 254.

"Set Time-Out (Minute)" 242 provides a user with the ability to set the time after which no motion is sensed by a connected motion sensor (not shown) before the connected lights turn off.

"Set Ramp Up (Seconds)" 244 allows a user to set the time in seconds it takes the lights to be brought up to the preselected light level (i.e., "ramp up") when motion is sensed by a connected motion sensor.

"Set Ramp Down (Seconds)" 246 provides a user with the ability to set the amount of time in seconds it will take for the lights to decrease in brightness from the "on" level of brightness to "off" (i.e., "ramp down") when no motion is sensed by a connected motion sensor for the preselected amount of time.

"Motion On" 248 and "Motion Off" 250 allow a user to select wither the connected motion sensor(s) are on (actively sensing for motion) or off (not actively sensing for motion). Preferably an indicator 258, such as the indicator "Motion Status" shown here, indicates the current status of the connected motion sensor(s), either "on" or "off."

A second display area 256 may be provided to show the current settings. Additionally, or alternatively, the second display area 256 may be used by a user to input a digit (e.g., 10) and then select any of the other buttons on the second screen 240. The digit will then be applied to the task depicted by the button and assigned the associated time unit. For example, if a user inputs "10" in the second display area 256 and then selects "Set Ramp Up (seconds)" 244, the ramp up time will be 10 seconds.

Similar to the first screen 210, "Bluetooth Connect" 252 provides the ability of a user to connect to other electronic devices via BLUETOOTH® wireless technology, and the "Back" button 254 allows a user to go back to the previous screen, which in this example is the first screen 210.

Figure 9:
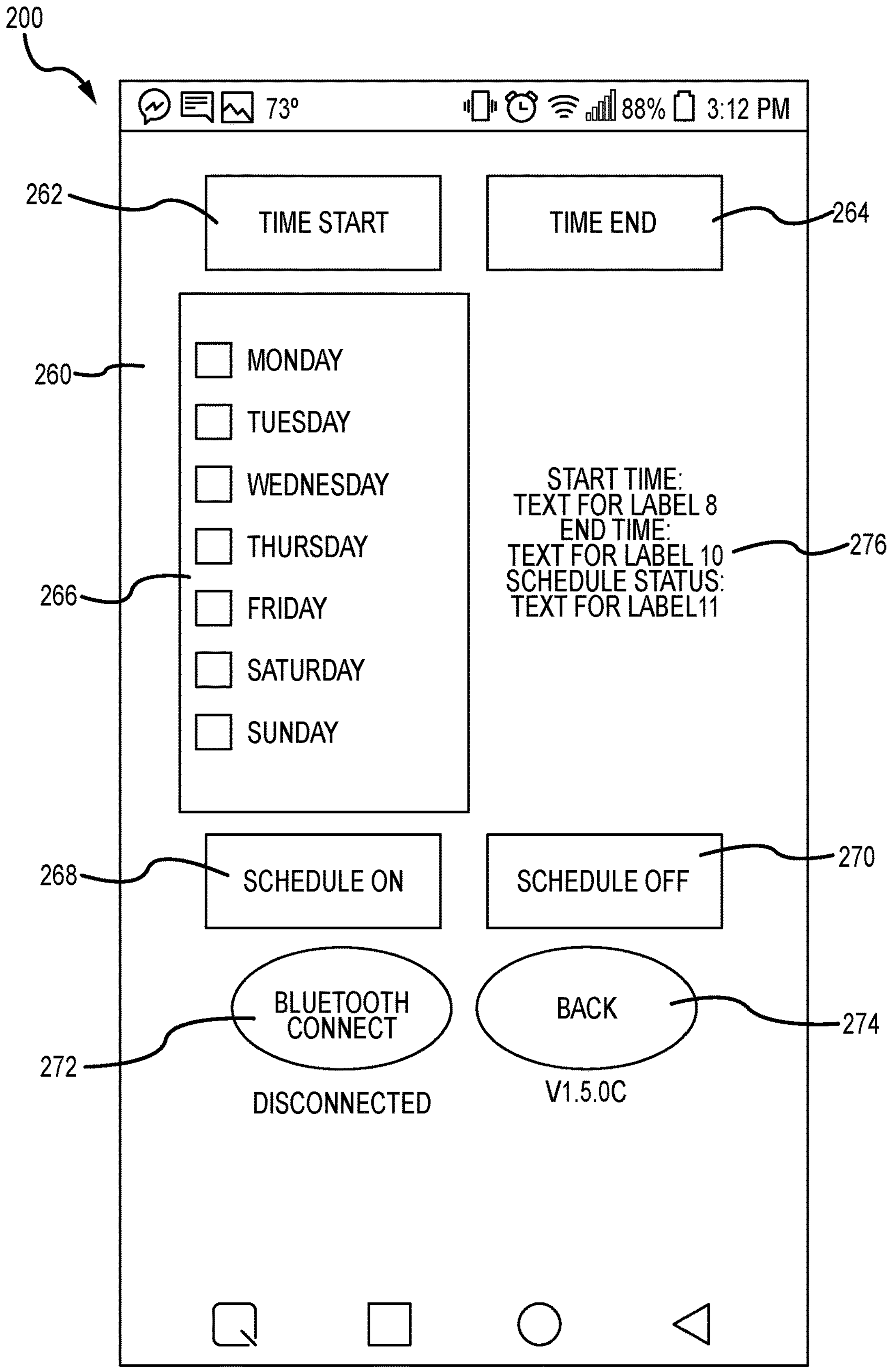
FIG. 9 is a third screen capture of the second embodiment GUI of the electronic device control application according to the present invention.

Looking back to the first screen 210 in FIG. 7, selecting "Schedule" 216 will take a user to a third screen 260 shown in FIG. 9. The third screen 260 preferably comprises a "Time Start" label 262 and a "Time End" label 264 that indicate the respective current start and stop time for connected light fixtures. A weekly schedule 266 provides users the ability to select which days of the week the start and stop times will apply. Buttons "Schedule On" 268 and "Schedule Off" 270 allow a user to turn on or turn off the schedule, respectively. A third display area 276 may be provided to show programmed information such as the start time, the end time, and the schedule status. Similar to the second screen 240, a "Bluetooth Connect" button 272 provides the ability of a user to connect to other electronic devices via BLUETOOTH® wireless technology, and the "Back" button 274 allows a user to go back to the previous screen, which in this example is the first screen 210.

Figure 10:
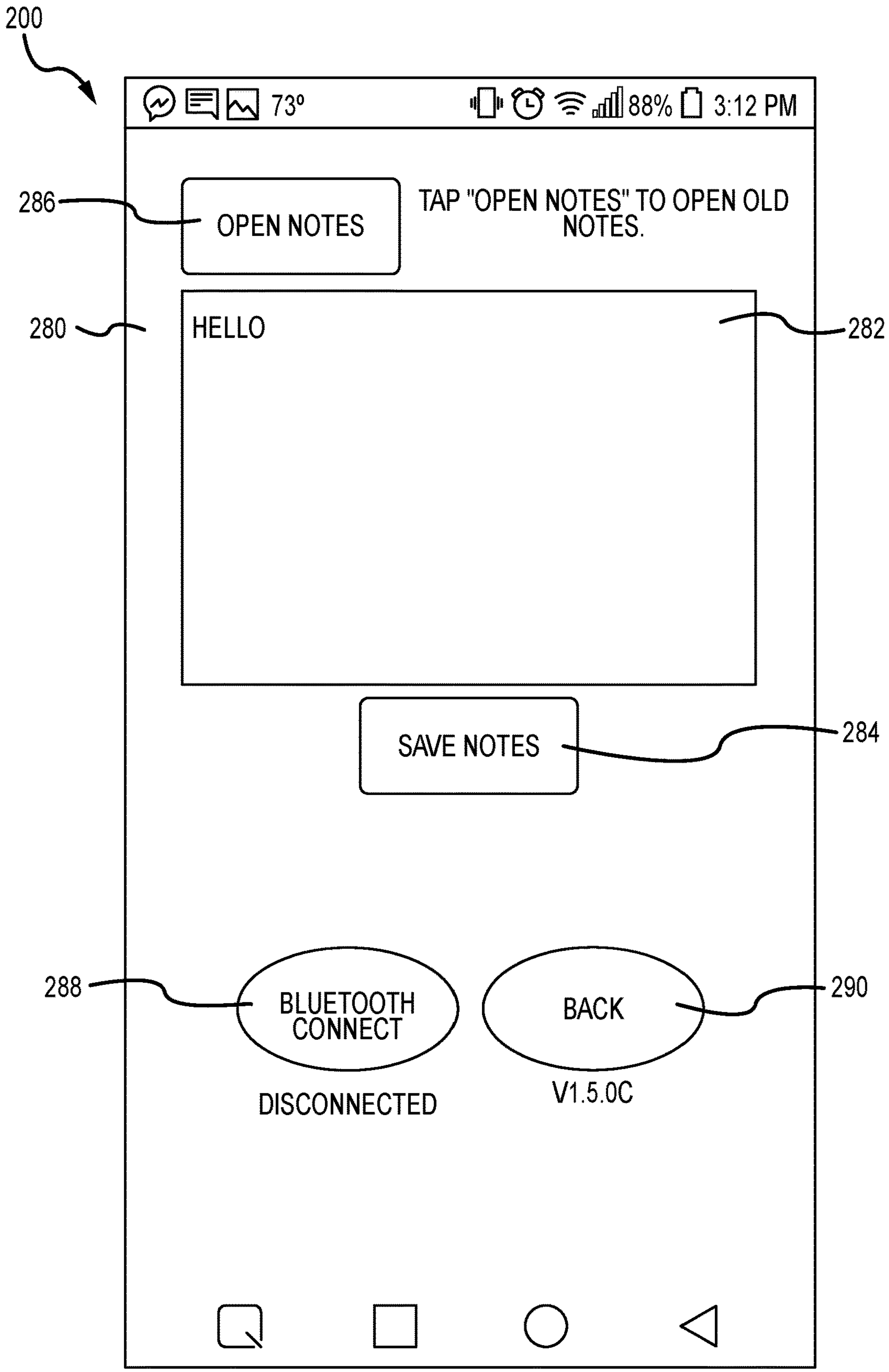
FIG. 10 is a fourth screen capture of the second embodiment GUI of the electronic device control application according to the present invention.

Going back to the first screen 210 in FIG. 7, selecting "Notes" 220 will take a user to a fourth screen 280 shown in FIG. 10. The fourth screen 280 preferably comprises an input area 282 in which a user may enter notes and pressing the "Save Notes" button 284 allows a user to save the entered notes. An "Open Notes" button 286 provides a user access to previously saved notes.

Again, similar to the first, second, and third screens 210,240,260, a "Bluetooth Connect" button 288 provides the ability of a user to connect to other electronic devices via BLUETOOTH® wireless technology, and the "Back" button 290 allows a user to go back to the previous screen, which in this case is the first screen 110.

An information screen (not shown) is also contemplated and can be included in either or both of the first and second GUI embodiments 100,200. The information screen may preferably include various data points (e.g., solar contribution, dimming line voltage level (see discussion below), motion status, schedule status, debugging information, etc.)

It is contemplated that a single control device can control up to four "zones" of electric devices. A "zone" is defined as a group of one or more connected electric devices, and if desired, each zone may be configured individually from the single control device. It should be noted that electric devices may include, but are not limited to, light fixture, electric fans, electric motors, etc.

It is also contemplated that a control device may configured to receive power information from one or more connected solar panels, preferably between one and four solar panels.

Preferably, each connected electric device is able to communicate to the control device the features the connected electric device is equipped with (e.g., motion sensor, direct connection to a solar panel, etc.) so the control device will know which buttons to provide on the screen.

It is further contemplated that multiple control devices may communicate with each other. In this setup, for example, selecting "Max Bright" from a first control device connected to a first set of lights may be communicated to a second control device connected to a second set of lights and effectively turning on both the first and second set of lights to their maximum light levels. This may be carried out, for example, through radio frequency (RF) transmitters or other methods now known or later developed.

FIG. 11 provides a flowchart illustrating a preferred method for monitoring and/or adjusting the distribution to and from electric devices in an electric system 300 according to the present invention. The electric system 300 preferably comprises a first power source consisting of direct current (DC) produced from at least one Photovoltaic Panel 310 (a.k.a., a Solar Panel; "PV Panel"), and a second power source consisting of alternating current (AC) power produced by a generator (e.g., power from a power utility company). As described above, the PV panel 310 powers a first plurality of LEDs directly ("Raw-DC LEDs" 312) and the AC power provides power to a second plurality of LEDs ("Converted-DC LEDs" 320) through one or more drivers (not shown) preferably located in a driver array 322 (a.k.a. the distribution power module 20; see FIGS. 2 and 3) which convert the AC power to DC power.

In this exemplary method, a user of the system 300 will preferably set a preferred foot-candle (i.e., lumen) level setpoint ("Setpoint"), which may be performed through the screen 110 discussed above with respect to the first embodiment GUI 100 (see FIG. 6), preferably based solely on light produced by the Converted-DC LEDs 320 as discussed above.

In normal operation, illumination is preferably provided solely through the Raw-DC LEDs 312 and, if needed, supplemented by the Converted-DC LEDs 320 to reach the preferred Setpoint. A current sensor 330 preferably senses the amount of current produced by the at least one PV Panel 310 ("PVI"). The current sensor 330 converts the PVI to an output voltage value preferably between 0-2.5V ("Output Voltage Value"). The Output Voltage Value is sent to a controller 340 which then converts the Output Voltage Value to a digital value, for example, between 0-1023 ("Digital Value"). The Digital Value is then compared to a reference table (not shown) through which a resulting index value ("Index Value") is determined.

Preferably, a dimming line voltage ("Vdim") is determined by converting the Index Value into a pulse-width-modulation (PWM) signal which is then ran through a Digital-to-Analog converter (DAC) 350 to output a first voltage between 0-5V. This first voltage is then amplified by an amplifier 370 to provide the Vdim in the range of 0-10V and sent to the at least one drivers in the driver array 322, which correlates with minimum and maximum driver AC power output for a dimmable driver, respectively. The drivers in the driver array 322 will then provide as much power to the Converted-DC LEDs 320 as is determined necessary by the controller 340 to reach the Setpoint.

As shown in FIG. 11, the Setpoint may be input via Bluetooth® wireless technology from a control device via a user interface 360 and other inputs such as a Real-Time-Clock 380 and motion sensor 390 may be incorporated for further control of the electric system 300.

The disclosed electric system 300 provides many advantages based on the ability to configure and monitor connected electric devices. Through an internet connection, the advantages grow larger by allowing a preauthorized person or system to access data regarding energy usage and production by connected electric devices and providing the ability to dim or turn off the Converted LEDs of connected light fixtures and/or turn off other connected electric devices remotely to reduce the baseload electricity demand at any given time. The ability to selectively reduce energy consumption and the ability to monitor the connected electric devices would also aid in emissions offset calculations.

The electric system 300 also has the ability to reduce the potential for arc-flash in existing electrical installations that rely on switching lighting loads from a circuit breaker because the voltage to the drivers can be reduced to the point that the LEDs turn off, effectively eliminating the need for a switch and allowing this system to be a retrofit solution without the need for adding lighting contactors/relays.

The foregoing is considered as illustrative only of the principles of the invention. Furthermore, because numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A lighting system comprising:

at least one photovoltaic (PV) panel; and a first light fixture comprising a first light emitting diode (LED) configured to receive raw DC power directly from the at least one PV panel;

a second light fixture comprising a second LED configured to receive converted DC power from an alternating current (AC) power source through a first driver; and a controller in electrical communication with the at least one PV panel, the first driver, and the first and second light fixtures, whereby the controller is configured to maintain a predetermined lumen setpoint level;

a current sensor configured to sense an amount of the raw DC power produced by the at least one PV panel, provide an output voltage based on the amount of the raw DC power sensed, and communicate the output voltage to the controller;

whereby the output voltage from the current sensor is converted to a dimming line voltage which determines an amount of the converted DC power to be output by the first driver to the second LED.

2. A method for distributing power to and from electric devices in an electric system, the method comprising steps of:

producing raw DC power with a photovoltaic (PV) panel;

delivering the raw DC power to a first LED of a first light fixture;

inputting a predetermined lumen level setpoint into a controller;

measuring an amount of the raw DC power output from the (PV) panel and providing an output voltage based on the amount of the raw DC power measured;

using the controller, comparing the predetermined lumen level setpoint with the output voltage;

determining an amount of converted DC power to be delivered to a second LED of a second light fixture to attain the predetermined lumen level setpoint; and delivering the amount of the converted DC power to the second LED.

3. The method of claim 2, wherein the step of determining the amount of converted DC power to be delivered to the second LED further comprises the steps of:

converting the output voltage to a digital value;

using a reference table, finding an index value based on the digital value;

converting the index value into a pulse-width-modulation signal;

converting the pulse-width-modulation signal to a first voltage between 0-5V through a digital-to-analog converter; and amplifying the first voltage with an amplifier to provide a dimming line voltage in a range of 0-10V to a dimmable driver, wherein the range of the dimming line voltage corresponds to a range of converted DC power output from the dimmable driver between a minimum and a maximum output.

4. The method of claim 2, wherein the amount of converted DC delivered is regulated by a dimmable driver.

5. The method in claim 2, wherein inputting the predetermined lumen level setpoint into the controller is performed wirelessly from a handheld device.

* * * * *